(12) United States Patent
Mun et al.

(10) Patent No.: US 11,035,170 B2
(45) Date of Patent: Jun. 15, 2021

(54) METHOD FOR MANUFACTURING SMART WINDOW (71) Applicant: LG Chem, Ltd., Seoul (KR)

(72) Inventors: In Ju Mun, Daejeon (KR); Nam Gyu Kim, Daejeon (KR); Hyo Jin Lee, Daejeon (KR); Kyung Ki Hong, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/759,853

(22) PCT Filed: Nov. 8, 2018

(86) PCT No.: PCT/KR2018/013507
§ 371 (c)(1),
(2) Date: Apr. 28, 2020

(87) PCT Pub. No.: WO2019/093774
PCT Pub. Date: May 16, 2019

(65) Prior Publication Data
US 2020/0332592 A1  Oct. 22, 2020

(30) Foreign Application Priority Data
Nov. 8, 2017 (KR) .................. 10-2017-0147938

(51) Int. Cl.
*E06B 9/24* (2006.01)
*E06B 9/17* (2006.01)
*G02F 1/1345* (2006.01)
*G02F 1/163* (2006.01)
*G02F 1/137* (2006.01)

(52) U.S. Cl.
CPC ............ *E06B 9/24* (2013.01); *E06B 9/17076* (2013.01); *G02F 1/13454* (2013.01); *G02F 1/13775* (2021.01); *G02F 1/163* (2013.01)

(58) Field of Classification Search
CPC .................................................. G02F 1/13454
See application file for complete search history.

(56) References Cited

U.S. PATENT DOCUMENTS

2003/0137630 A1  7/2003  Niiya
2007/0095468 A1  5/2007  Kim et al.
(Continued)

FOREIGN PATENT DOCUMENTS

CN  1434323 A  8/2003
CN  101415550 A  4/2009
(Continued)

OTHER PUBLICATIONS

International Search Report for Application No. PCT/KR2018/013507, dated Feb. 14, 2019, pp. 1-3.
(Continued)

*Primary Examiner* — Edmond C Lau
(74) *Attorney, Agent, or Firm* — Lerner, David, Littenberg, Krumholz & Mentlik, LLP (57) ABSTRACT

A method for producing a smart window and the smart window are provided. The method provides the smart window having product quality and productivity by improving evenness of a seal line, for example, a thickness deviation, a line width deviation and straightness through selection of a suitable sealant and process optimization.

16 Claims, 5 Drawing Sheets

(56) References Cited

U.S. PATENT DOCUMENTS

| | | |
|---|---|---|
| 2009/0181203 A1 | 7/2009 | Valentin et al. |
| 2010/0326592 A1 | 12/2010 | Ishitani et al. |
| 2012/0044445 A1 | 2/2012 | Monma et al. |
| 2014/0098318 A1* | 4/2014 | Kobayashi ............ G02F 1/1339 349/43 |
| 2016/0033799 A1* | 2/2016 | Ding ...................... B05D 7/542 349/153 |
| 2016/0290033 A1 | 10/2016 | Messere |

FOREIGN PATENT DOCUMENTS

| | | | |
|---|---|---|---|
| CN | 105324181 | A | 2/2016 |
| CN | 105793510 | A | 7/2016 |
| EP | 2604667 | A2 | 6/2013 |
| JP | H06129168 | A | 5/1994 |
| JP | H09077536 | A | 3/1997 |
| JP | H10175269 | A | 6/1998 |
| JP | 2001337335 | A | 12/2001 |
| JP | 2003140196 | A | 5/2003 |
| JP | 2003295201 | A | 10/2003 |
| JP | 2004109448 | A | 4/2004 |
| JP | 2010096889 | A | 4/2010 |
| JP | 2010139656 | A | 6/2010 |
| JP | 2012063761 | A | 3/2012 |
| JP | 2014071438 | A | 4/2014 |
| JP | 2017068196 | A | 4/2017 |
| KR | 20070047569 | A | 5/2007 |
| KR | 20100129155 | A | 12/2010 |
| KR | 20120092247 | A | 8/2012 |
| KR | 20160095128 | A | 8/2016 |
| KR | 20170063293 | A | 6/2017 |
| TW | 200638488 | | 11/2006 |
| TW | 201326962 | A | 7/2013 |
| WO | 2016043164 | A1 | 3/2016 |

OTHER PUBLICATIONS

Taiwan Search Report for Application No. 107139733, dated Jan. 22, 2020, 1 page.

Chinese Search Report for Application No. CN201880069803.9 dated Apr. 2, 2021.

* cited by examiner

METHOD FOR MANUFACTURING SMART WINDOW

CROSS REFERENCE TO RELATED APPLICATIONS

The present application is a national phase entry under 35 U.S.C. § 371 of International Application No. PCT/KR2018/013507 filed Nov. 8, 2018 which claims priority from Korean Patent Application No. 10-2017-0147938 filed on Nov. 8, 2017, the disclosures of which are incorporated herein by reference in their entirety.

TECHNICAL FIELD

The present application relates to a method for producing a smart window.

BACKGROUND ART

A smart window is a window capable of adjusting light transmittance, which is also called a smart blind, an electronic curtain, a transmittance-variable glass or a dimming glass, and the like. In the case of a smart window using a plastic film, a product can be implemented through a process such as liquid crystal injection and ODF (one drop filling) (Patent Document 1: Korean Unexamined Patent Publication No. 2012-0092247).

At this time, a sealant is used to confine liquid crystals within an active area. Defects such as sealant contamination due to liquid crystal overflow may occur depending on the characteristics of the sealant and the process conditions. If the sealant characteristics and process conditions are not suitable, disconnection of the seal line or unevenness of thickness and width occurs to result in deterioration of product quality and productivity.

DISCLOSURE

Technical Problem

An object of the present application is to solve the above problem, and the present application provides a method for producing a smart window in which product quality and productivity are improved by improving evenness of a seal line, for example, a thickness deviation, a line width deviation and straightness through selection of a suitable sealant and process optimization.

Technical Solution

Figure 1:
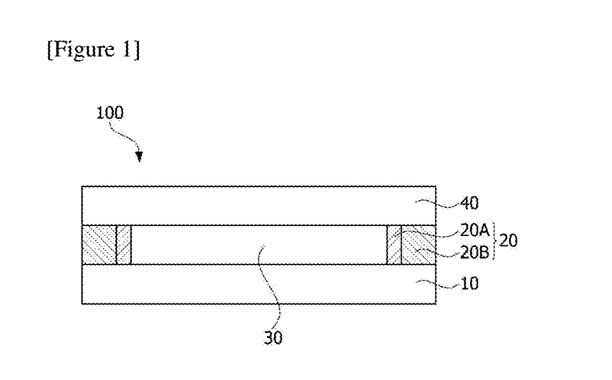
FIG. 1 is a schematic diagram of a smart window structure.

The present application relates to a method for producing a smart window. The present application may be, for example, a method for producing a smart window having the structure of FIG. 1. As shown in FIG. 1, the smart window (100) may have a structure in which a light modulating layer (30) is present between a first electrode film (10) and a second electrode film (40) arranged opposite to each other. The light modulating layer (30) may be present in an inner region divided by a seal line (20), and the first electrode film (10) and the second electrode film (40) may be bonded together via the seal line (20). Hereinafter, when a light modulating layer exists in an inner region divided by a seal line, it can be referred to as an active area.

According to the method for producing a smart window of the present application, the seal line (20) may be formed doubly, including an inner seal line (20A) and an outer seal line (20B). The light modulating layer may be present in an inner region divided by the inner seal line (20A). That is, the inner seal line may exist closer to the light modulating layer than the outer seal line.

The method for producing a smart window of the present application may comprise steps of drawing a first sealant on a first electrode film using a first nozzle to form an inner seal line and drawing a second sealant on the outside of the inner seal line using a second nozzle to form an outer seal line. Hereinafter, the first sealant and the second sealant can be referred to as an inner sealant and an outer sealant, respectively.

According to the present application, it is possible to improve evenness of a seal line, for example, a thickness deviation, a line width deviation and straightness through selection of suitable sealants as the inner sealant and the outer sealant and process optimization in the steps of forming the inner seal line and the outer seal line.

In one example, the viscosity of the inner sealant may be higher than the viscosity of the outer sealant. When the viscosity of the inner seal line is high, it has low spreadability, so that a uniform seal line may be formed when the first electrode film and the second electrode film are bonded together. On the other hand, when the viscosity of the inner seal line is low, it has high spreadability, so that evenness of the seal line may be hindered. If the viscosity of the outer seal line is low, the spreadability is good, and thus it may be advantageous to reduce the difference in height between the seal line area and the active area.

The viscosity of the inner sealant may be in a range of, for example, 100,000 mPas to 300,000 mPas. Specifically, the viscosity of the inner sealant may be 110,000 mPas or more, 120,000 mPas or more, 130,000 mPas or more, 140,000 mPas or more, 150,000 mPas or more, 160,000 mPas or more, 170,000 mPas or more, 180,000 mPas or more, 190,000 mPas or more, or 200,000 mPas or more, and may be 300,000 mPas or less, 290,000 mPas or less, 280,000 mPas or less, 270,000 mPas or less, 260,000 mPas or less, 250,000 mPas or less, 240,000 mPas or less, 230,000 mPas or less, 220,000 mPas or less, or 210,000 mPas or less. According to one example of the present application, the viscosity of the inner sealant may be in the range of, for example, 190,000 mPas to 210,000 mPas.

The viscosity of the external sealant may be, for example, 60,000 mPas or less. The lower limit of the viscosity of the external sealant may be, for example, 15,000 mPas or more. Specifically, the viscosity of the outer sealant may be 59,000 mPas or less, 58,000 mPas or less, 57,000 mPas or less, 56,000 mPas or less, 55,000 mPas or less, 54,000 mPas or less, 53,000 mPas or less, or 52,000 mPas or less, and may be 20,000 mPas or more, 25,000 mPas or more, 30,000 mPas or more, 35,000 mPas or more, 40,000 mPas or more, 45,000 mPas or more, or 50,000 mPas mPas or more. According to one example of the present application, the viscosity of the outer sealant may be in the range of, for example, 51,000 mPas to 53,000 mPas. If the viscosity of the outer sealant is too high, it has low spreadability, so that the thickness unevenness of the seal line after the bonding may become larger, and thus it is preferred that the viscosity of the outer sealant is in the above range.

The viscosity of the sealant can be adjusted by a method known in the art. In one example, the viscosity of the sealant can be adjusted through a viscosity modifier. The viscosity modifier includes a viscosity increasing agent or a viscosity reducing agent, where an appropriate amount of the viscosity modifier may be added according to the viscosity of the sealant to be implemented. As the viscosity modifier, a viscosity modifier known in the art can be used, and for example, silica, potassium carbonate, talc, aluminum oxide, alumina, loess or glass powder, and the like can be used.

The content of the viscosity modifier may be appropriately adjusted in consideration of the viscosity of the sealant. The viscosity modifier may be contained in a ratio of, for example, 1 part by weight to 30 parts by weight, 1 part by weight to 20 parts by weight or 1 part by weight to 15 parts by weight relative to 100 parts by weight of a base resin of the sealant. According to one example of the present application, the first sealant may comprise a viscosity modifier in a ratio of 10 to 15 parts by weight relative to 100 parts by weight of the base resin, and the second sealant may comprise a viscosity modifier in a ratio of 1 part by weight to 5 parts by weight relative to 100 parts by weight of the base resin.

The sealant may comprise a curable resin as the base resin. As the base resin, an ultraviolet curable resin or a thermosetting resin known to be usable in the sealant in the art can be used. The ultraviolet curable resin may be a polymer of an ultraviolet curable monomer. The thermosetting resin may be a polymer of a thermosetting monomer. As the base resin of the sealant, for example, an acrylate resin, an epoxy resin, a urethane resin, a phenol resin or a mixture of the resins can be used. In one example, the base resin may be an acrylate resin, where the acrylate resin may be a polymer of an acrylic monomer. The acrylic monomer may be, for example, a multifunctional acrylate. In one example, the sealant may further comprise a monomer component in the base resin. The monomer component may be, for example, a monofunctional acrylate. In this specification, the monofunctional acrylate may mean a compound having one acrylic group, and the multifunctional acrylate may mean a compound having two or more acrylic groups. The curable resin can be cured by irradiation with ultraviolet rays and/or heating. The ultraviolet irradiation condition or the heating condition may be appropriately performed within a range without impairing the purpose of the present application. The sealant may further comprise an initiator, for example, a photoinitiator or a thermal initiator, if necessary.

In one example, the first sealant may be drawn on a first electrode film by a dispenser equipped with a first nozzle. The second sealant may be drawn on a first electrode film outside an inner seal line by a dispenser equipped with a second nozzle.

Figure 2:
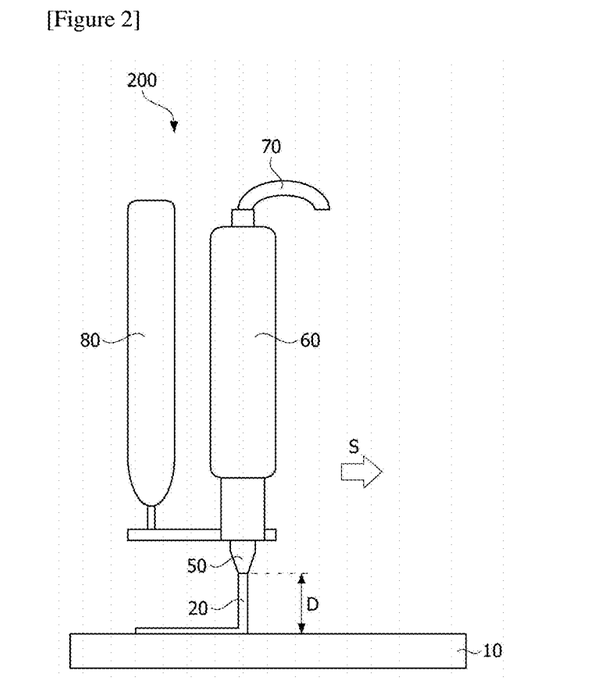
FIG. 2 is a schematic view of a sealant dispenser.

As the dispenser, a screw master can be used. FIG. 2 illustratively shows the structure of the dispenser (200). The dispenser is provided with a nozzle for discharging a sealant, where the nozzle may comprise a needle (50). In the present application, the object of the present application can be achieved by optimizing the process conditions of the first and second sealants.

In one example, the inner sealant discharge amount of the first nozzle may be smaller than the outer sealant discharge amount of the second nozzle. If the inner sealant discharge amount of the first nozzle is larger than the out sealant discharge amount of the second nozzle, the spreading region is widened when the second electrode film is bonded together to the first electrode film to press the sealant, and accordingly, the deviation of the spreading region is also increased, so that the straightness of the seal line can be reduced. On the contrary, if the inner sealant discharge amount of the first nozzle is smaller than the outer sealant discharge amount of the second nozzle, the sealant spreading region is reduced when the second electrode film is bonded together to the first electrode film, and thus the deviation of the spreading region is also decreased, so that the straightness of the seal line can be improved.

The inner sealant discharge amount of the first nozzle may be in a range of, for example, 70 rpm to 180 rpm. Specifically, the inner sealant discharge amount of the first nozzle may be 70 rpm or more, 80 rpm or more, 90 rpm or more, 100 rpm, 120 rpm or more, 130 rpm or more, 140 rpm or more, or 150 rpm or more, and may be 180 rpm or less, 170 rpm or less, 160 rpm or less, 150 rpm or less, 140 rpm or less, 130 rpm or less, 120 rpm or less, or 110 rpm or less. According to one example of the present application, the inner sealant discharge amount of the first nozzle may be, for example, in a range of 145 rpm to 155 rpm or in a range of 95 rpm to 105 rpm.

The outer sealant discharge amount of the second nozzle may be, for example, in a range of 200 rpm to 500 rpm. Specifically, the outer sealant discharge amount of the second nozzle may be 200 rpm or more, 210 rpm or more, 220 rpm or more, 230 rpm or more, 240 rpm or more, 250 rpm or more, 260 rpm or more, 270 rpm or more, 280 rpm or more, or 290 rpm or more, and may be 500 rpm or less, 490 rpm or less, 480 rpm or less, 470 rpm or less, 460 rpm or less, 450 rpm or less, 440 rpm or less, 430 rpm or less, 420 rpm or less, 410 rpm or less, or 400 rpm or less. According to one example of the present application, the inner sealant discharge amount of the second nozzle may be, for example, in the range of 290 rpm to 310 rpm or in the range of 390 rpm to 410 rpm.

The unit rpm (revolution per minute) means a unit that indicates how many times the device that works while rotating rotates for one minute. When the discharge amounts of the first and second nozzles are within the above ranges, it may be advantageous from the viewpoint of improving the straightness of the seal line.

Figure 3:
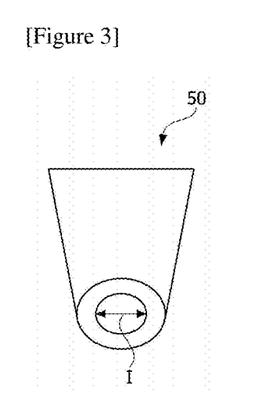
FIG. 3 is a schematic diagram showing an inner diameter of a needle.

In one example, the inner diameter of the first nozzle may be smaller than the inner diameter of the second nozzle. FIG. 3 is a schematic diagram illustratively showing the inner diameter (I) of the nozzle. The inner diameter of the nozzle may affect the discharge amount of the sealant when the sealant is discharged from the dispenser. If the inner diameter of the nozzle is not suitable, it is difficult to control the discharge amount of the sealant, or the sealant leakage may occur. In one example, it may be advantageous that the smaller the discharge amount, the smaller the inner diameter, and it may be advantageous that the larger the discharge amount, the larger the inner diameter. If the inner diameter of the nozzle is small in the case of a large discharge amount, the nozzle is clogged to be not discharged, so that the sealant breakage can occur, or on the contrary, if the inner diameter of the nozzle is large in the case of a small discharge amount, the sealant leakage can occur. Therefore, it may be advantageous in terms of dischargeability and workability that the inner diameter of the first nozzle having a small discharge amount is smaller than the inner diameter of the second nozzle having a large discharge amount.

The inner diameter of the first nozzle may be in a range of, for example, 0.05 mm to 0.15 mm. Specifically, the inner diameter of the first nozzle may be 0.05 mm or more, 0.06 mm or more, 0.07 mm or more, 0.08 mm or more, 0.09 mm or more, and may be 0.15 mm or less, 0.14 mm or less, 0.13 mm or less, 0.12 mm or less, or 0.11 mm or less. According to one example of the present application, the inner diameter of the first nozzle may be, for example, in the range of 0.09 mm to 0.11 mm. The inner diameter of the second nozzle may be, for example, in the range of 0.21 mm to 0.52 mm. Specifically, the inner diameter of the second nozzle may be 0.21 mm or more, 0.22 mm or more, 0.23 mm or more, 0.24 mm or more, 0.25 mm or more, or 0.26 mm or more, and may be 0.52 mm or less, 0.50 mm or less, 0.45 mm or less, 0.40 mm or less, 0.35 mm or less, 0.30 mm or less, 0.27 mm or less, or 0.26 mm or less. According to one example of the present application, the inner diameter of the second nozzle may be, for example, in the range of 0.25 mm to 0.27 mm. When the inner diameters of the first nozzle and the second nozzle are in the above ranges, it may be advantageous in terms of workability and dischargeability of the sealant.

In one example, the drawing speeds of the inner sealant and the outer sealant may be in a range of 1000 mm/min to 3000 mm/min, respectively. Specifically, the drawing speeds of the inner sealant and the outer sealant may be 1000 mm/min or more, 1100 mm/min or more, 1200 mm/min or more, 1300 mm/min or more, 1400 mm/min or more, 1500 mm/min or more, 1600 mm/min or more, 1700 mm/min or more, 1800 mm/min or more, 1900 mm/min or more, or 2000 mm/min or more, and may be 3000 mm/min or less, 2900 mm/min or less, 2800 mm/min or less, 2700 mm/min or less, 2600 mm/min or less, 2500 mm/min or less, 2400 mm/min or less, 2300 mm/min or less, 2200 mm/min or less, or 2100 mm/min or less. According to one example of the present application, the drawing speeds of the inner sealant and the outer sealant may be, for example, in the range of 1900 mm min to 2100 mm/min.

The drawing speed may mean a drawing speed of the dispenser in a state where the first electrode film is fixed. S in FIG. 2 means a drawing advancing direction of the dispenser. In one example, the drawing speeds of the inner sealant and the outer sealant may be the same or different. If the drawing speed of the dispenser is excessively high, drawing shape distortion and sealant breakage phenomena may occur. If the drawing speed of the dispenser is too low, the productivity may be decreased and the discharge amount may be excessively increased. In the process conditions that the drawing speeds of the inner and outer sealants are in the above ranges, it may be advantageous to improve evenness of a seal line, for example, a thickness deviation, a line width deviation and straightness.

In one example, in the step of drawing the inner sealant, i.e., in the step of forming the inner seal line, the distance between the needle of the first nozzle and the first electrode film may be in a range of 120 μm to 230 μm. Specifically, the distance between the needle of the first nozzle and the first electrode film may be 120 μm or more, 130 μm or more, 140 μm or more, 145 μm or more, 150 μm or more, and may be 230 μm or less, 215 μm or less, 205 μm or less, 200 μm or less, 180 μm or less, 170 μm or less, 160 μm or less, 155 μm or less, or 150 μm or less. According to one example of the present application, the distance between the needle of the first nozzle and the first electrode film may be in the range of, for example, 145 μm to 155 μm, or in the range of 195 μm to 205 μm.

In one example, in the step of drawing the outer sealant, i.e., in the step of forming the outer seal line, the distance between the needle of the second nozzle and the first electrode film may be in a range of 150 μm to 330 μm. The distance between the needle of the second nozzle and the first electrode film may be 150 μm or more, 160 μm or more, 170 μm or more, 180 μm or more, 190 μm or more, 195 μm or more, 200 μm or more, 220 μm or more, 240 μm or more, 260 μm or more, 280 μm or more, or 300 μm or more, and may be 330 μm or less, 315 μm or less, 300 μm or less, 275 μm or less, 250 μm or less, 240 μm or less, 230 μm or less, 220 μm or less, 210 μm or less, or 205 μm or less. According to one example of the present application, the distance between the needle of the second nozzle and the first electrode film may be in the range of, for example, 195 μm to 205 μm or in the range of 295 μm to 305 μm.

In one example, the distance between the needle of the first nozzle and the first electrode film may be shorter than the distance between the needle of the second nozzle and the second electrode film. In the case of the inner sealant, the discharge amount is small, and thus it may be advantageous that the distance is relatively short so that the discharged sealant can contact the first electrode film. Otherwise, since the discharge amount is small, defects that the discharged sealant is not transferred to the first electrode film may occur. On the contrary, in the case of the outer sealant, since the discharge amount is large, the discharged sealant must be able to contact the electrode film. If the distance between the needle of the second nozzle and the first electrode film is too close, the needle contacts the electrode film due to the film and the stage step, and the like, whereby the electrode film may be damaged or the needle may be damaged.

According to the method for producing a smart window of the present application, a smart window with improved product quality and productivity can be produced by improving evenness of a seal line, for example, a thickness deviation, a line width deviation and straightness.

In one example, the difference ($H_1$-$H_2$) between the height ($H_1$) of the seal line area and the height ($H_2$) of the active area may be less than 5 μm. As the height difference is smaller, it may mean that the seal line is formed with a uniform thickness. The production method may further comprise a step of forming a light modulating layer in the region divided by the inner seal line after the step of forming the outer seal line. The light modulating layer may be performed before bonding of the first electrode film and the second electrode film together, which is described below, or may also be performed after the bonding. In one example, when the step of forming a light modulating layer is performed before the bonding, the light modulating material may be formed by applying a light modulating material in the region divided by the inner seal line, for example, by an ODF (one drop filling) process. In another example, when the step of forming a light modulating layer is performed after the bonding, the light modulating layer may be formed through a step of injecting a light modulating material into the region divided by the inner seal line through some regions of the inner and outer seal lines.

Here, as the light modulating layer, a known layer known to be capable of light modulation, for example, light transmission or blocking, or color conversion, may be applied. For example, the light modulating layer may be a liquid crystal layer switching between a diffusion mode and a transparent mode by on-off of a voltage, for example, a vertical electric field or a horizontal electric field, a liquid crystal layer switching between a transparent mode and a black mode, a liquid crystal layer switching between a transparent mode and a color mode, or a liquid crystal layer switching between color modes of different colors.

Various light modulating layers, for example, liquid crystal layers, capable of performing the above actions are well known. As one exemplary light modulating layer, a liquid crystal layer used in a typical liquid crystal display can be used. The liquid crystal layer may comprise liquid crystals or a mixture of liquid crystals and a dichroic dye.

In another example, the light modulating layer may also be various types of polymer dispersed liquid crystal layers, pixel-isolated liquid crystal layers, suspended particle layers, or electrochromic layers.

In the present application, the polymer dispersed liquid crystal layer (PDLC layer) is a superordinate concept including a so-called PILC layer (pixel isolated liquid crystal layer), PDLC layer (polymer dispersed liquid crystal layer), PNLC layer (polymer network liquid crystal layer) or PSLC layer (polymer stabilized liquid crystal layer), and the like.

The production method may further comprise a step of bonding the second electrode film to the first electrode film after the step of forming the outer seal line. As described above, the bonding of the first electrode film and the second electrode film may be performed before the formation of the light modulating layer or may be performed after the formation. According to one example of the present application, the bonding step may be performed after the light modulating layer is formed.

After the first electrode film and the second electrode film are bonded together, the sealant can be cured by a known sealant curing method, for example, a method such as heat application and/or ultraviolet irradiation to produce a smart window.

In one example, in the process of bonding the first electrode film and the second electrode film together, the inner sealant and the outer sealant can be close to each other by spreading. That is, in the process of drawing the outer seal line, the outer sealant is drawn at a predetermined distance from the inner seal line, but in the process of bonding the first electrode film and the second electrode film together, it can be seen that the inner seal line and the outer seal line are close to each other to constitute an integral sealant. The first electrode film and the second electrode film may each comprise a plastic film and a conductive layer formed on the plastic film.

The plastic film can be exemplified by a polyester film such as a PC (polycarbonate) film, a PEN (polyethylene naphthalate) film or a PET (polyethyleneterephthalate) film, an acrylic film such as a PMMA (poly(methyl methacrylate)) film, a cellulose polymer film such as TAC (triacetyl cellulose), an olefin film such as a PE (polyethylene) film, a PP (polypropylene) film or a COP (cycloolefin polymer) film, a polybenzimidazole film, a polybenzoxazole film, a polybenzazole film, a polybenzthiazole film or a polyimide film, and the like, but is not limited thereto. The thickness of the film and the like can be selected in consideration of the level of the material to be applied to a general smart window.

As the conductive layer, one formed by depositing a conductive polymer, a conductive metal, a conductive nanowire, or a metal oxide such as ITO (indium tin oxide) can be used. In addition to this, various materials and forming methods capable of forming a transparent electrode are known, which can be applied without limitation.

In addition, a functional layer such as a liquid crystal alignment film, a barrier layer or a hard coating layer may also be further formed on the first electrode film and the second electrode film.

The present application relates to a smart window. An exemplary smart window can be made according to the above production method. The exemplary smart window may have excellent evenness of a seal line, for example, thickness deviation, line width deviation and straightness.

FIG. 1 illustratively shows a smart window. The exemplary smart window (100) may comprise a first electrode film (10) and a second electrode film (40) disposed opposite to each other, a light modulating layer (30) between the first electrode film (10) and the second electrode film (40) and a seal line (20) bonding the first electrode film (10) and the second electrode film (40) together. The light modulating layer (30) may be present in an inner region divided by the seal line (20). The seal line (20) may comprise an inner seal line (20A) and an outer seal line (20B). The inner seal line (20A) may exist closer to the light modulating layer (30) than the outer seal line (20B). The viscosity of the inner seal line (20A) may be higher than the viscosity of the outer seal line (20B). For other matters, the contents described in the method for producing a smart window may be applied equally.

The exemplary smart window may comprise a seal line having a uniform thickness. In one example, the difference ($H_1$-$H_2$) between the height ($H_1$) of the seal line area and the height ($H_2$) of the active area may be less than 5 μm. When a light modulating layer is present in an inner region divided by a seal line, it can be referred to as an active area. The difference ($H_1$-$H_2$) of the height may be specifically 4 μm or less, 3 μm or less, or 2 μm or less. As the height difference ($H_1$-$H_2$) is smaller, it means that the seal line is formed with a uniform thickness, and thus the lower limit is not particularly limited, but it may be, for example, more than 0 μm or 1 μm or more. The exemplary smart window may comprise a seal line with a uniform thickness as above through selection of a suitable sealant and process optimization.

The exemplary smart window may comprise a seal line having a uniform line width. In one example, the difference ($W_1$-$W_2$) between the maximum width ($W_1$) and the minimum width ($W_2$) of the seal line may be less than 2 mm. The width difference ($W_1$-$W_2$) may be specifically 1.5 mm or less, 1 mm or less, or 0.5 mm or less. As the width difference ($W_1$-$W_2$) is smaller, it means that the seal line is formed with a uniform line width, and thus the lower limit is not particularly limited, but it may be, for example, more than 0 mm or 0.1 mm or more. The exemplary smart window may comprise a seal line with a uniform line width as above through selection of a suitable sealant and process optimization.

The exemplary smart window may comprise a seal line with excellent continuity or straightness. In one example, the seal line may have two or less, or one or less regions where breakage occurs, or no region where breakage occurs. The region where breakage occurs may mean a region where breakage occurs in a certain area, or a region where breakage occurs in the entire area to cause disconnection, base on the width of the seal line. The exemplary smart window may comprise a seal line having excellent continuity or straightness as above through selection of a suitable sealant and process optimization.

The present application relates to a use of a smart window. The exemplary smart window has excellent evenness of a seal line, for example, thickness deviation, line width deviation and straightness, whereby product quality and productivity can be improved. Such a smart window can be applied to various applications including various construction or vehicle materials that need to control transmittance, or eyewear such as goggles for augmented reality experience or sports, sunglasses or helmets.

Advantageous Effects

According to the method for producing a smart window of the present invention, evenness of a seal line, for example, a thickness deviation, a line width deviation and straightness are improved by selecting a suitable sealant and optimizing the process, whereby a smart window with improved product quality and productivity can be produced.

MODE FOR INVENTION

Hereinafter, the present application will be specifically described by way of examples, but the scope of the present application is not limited by the following examples.

Comparative Example 1

Figure 4:
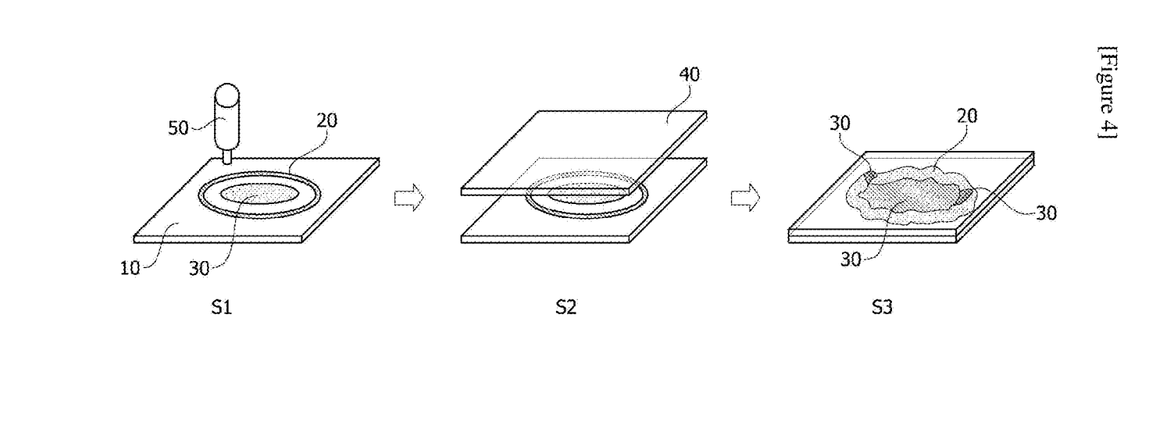
FIG. 4 is a schematic diagram of a production method of a smart window in Comparative Example 1.

The smart window of Comparative Example 1 was produced according to the production method of FIG. 4. Specifically, two PET films each having an ITO (indium tin oxide) layer formed on one surface thereof were prepared as a first electrode film and a second electrode film, respectively. A seal line was formed by drawing a sealant having a viscosity of 200,000 mPas on the ITO layer of the first electrode film using the dispenser of FIG. 2 such that the area of the active area was in width×length=180 mm×150 mm (based on the outer size of the seal line). The sealant comprises an acrylate resin, HEA (hydroxyethyl acrylate), IBOA (isobornyl acrylate), Igarcure 819 (initiator) and silica (viscosity modifier) in a weight ratio of 70:15:15:3:12. At this time, a needle having an inner diameter of 0.25 mm was applied as a nozzle, the distance between the needle of the nozzle and the first electrode film was maintained at 200 μm, and the rotation of the nozzle was adjusted to 400 rpm to control a discharge amount of the sealant. The drawing speed of the sealant in the dispenser was set at 2000 mm/min. Next, a mixture of liquid crystals and a dye was applied in the active area on the ITO layer of the first electrode film. Next, the second electrode film was laminated on the first electrode film on which the seal line was formed, the first electrode film and the second electrode film were bonded together, and then the sealant was irradiated with ultraviolet rays having a wavelength of 380 nm at an intensity of 3000 mJ and cured to produce a smart window.

Example 1

Figure 5:
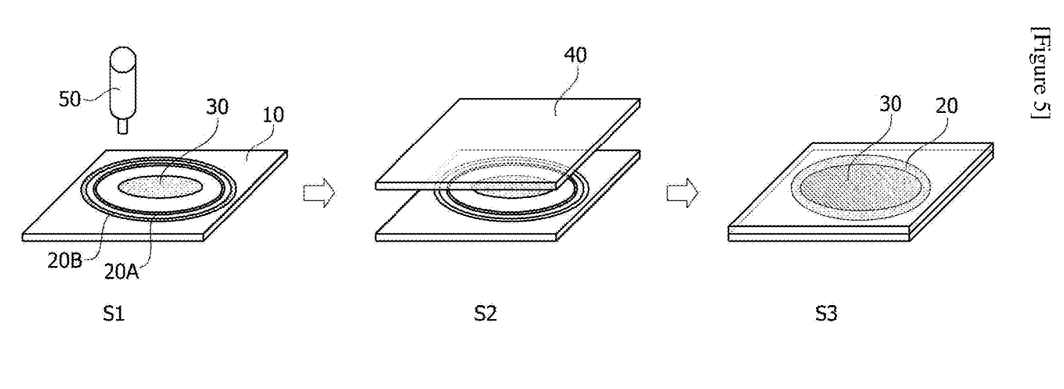
FIG. 5 is a schematic diagram of a production method of a smart window in Example 1.

The smart window of Example 1 was produced according to the production method of FIG. 5. Specifically, two PET films each having an ITO (indium tin oxide) layer formed on one surface thereof were prepared as a first electrode film and a second electrode film, respectively. An inner seal line was formed by drawing a first sealant having a viscosity of 200,000 mPas on the ITO layer of the first electrode film using the dispenser of FIG. 2 such that the area of the active area was 180 mm (width)×150 mm (length) (based on the outer size). The first sealant comprises an acrylate resin, HEA (hydroxyethyl acrylate), IBOA (isobornyl acrylate), Igarcure 819 (initiator) and silica (viscosity modifier) in a weight ratio of 70:15:15:3:12. A needle having an inner diameter of 0.1 mm was applied as a nozzle, the distance between the needle of the nozzle and the first electrode film was maintained at 150 μm, and the rotation of the nozzle was adjusted to 150 rpm to control a discharge amount of the first sealant. Next, a second sealant having a viscosity of 52,000 mPas was drawn to the outside of the inner seal line to form an outer seal line. The second sealant comprises an acrylate resin, HEA (hydroxyethyl acrylate), IBOA (isobornyl acrylate), Igarcure 819 (initiator) and silica (viscosity modifier) in a weight ratio of 70:15:15:3:2. At this time, a needle having an inner diameter of 0.26 mm was applied as a nozzle, the distance between the needle of the nozzle and the first electrode film was maintained at 200 μm, and the rotation of the nozzle was adjusted to 300 rpm to control a discharge amount of the second sealant. The drawing speed of the first and second sealants in the dispenser was set at 2000 mm/min. Next, the liquid crystals were applied in the region divided by the seal line on the ITO layer of the ITO/PET film. Next, the second electrode film was laminated on the first electrode film on which the seal line was formed, the first electrode film and the second electrode film were bonded together, and then the sealant was irradiated with ultraviolet rays having a wavelength of 380 nm at an intensity of 3000 mJ and cured to produce a smart window.

Examples 2 to 4 and Comparative Example 2

Smart windows of Examples 2 to 4 and Comparative Example 2 were produced in the same manner as in Example 1, except that the seal line forming process conditions were changed as shown in Table 1 below.

TABLE 1

|  | Position | Nozzle Discharge Amount (rpm) | Dispenser Drawing Speed (mm/min) | Distance between Needle of Nozzle and Film (μm) | Nozzle Inner Diameter (mm) |
| --- | --- | --- | --- | --- | --- |
| Comparative Example 1 | One kind | 400 | 2000 | 200 | 0.25 |
| Example 1 | Inner | 150 | 2000 | 150 | 0.1 |
|  | Outer | 300 | 2000 | 200 | 0.26 |
| Example 2 | Inner | 100 | 2000 | 150 | 0.1 |
|  | Outer | 400 | 2000 | 200 | 0.26 |
| Example 3 | Inner | 150 | 2000 | 200 | 0.1 |
|  | Outer | 300 | 2000 | 300 | 0.26 |
| Example 4 | Inner | 150 | 2000 | 150 | 0.1 |
|  | Outer | 300 | 2000 | 200 | 0.26 |
| Comparative Example 2 | Inner | 300 | 2000 | 200 | 0.26 |
|  | Outer | 150 | 2000 | 150 | 0.1 |

Evaluation Example 1. Evaluation of Seal Line Height Step

For each of Comparative Examples 1 and 2 and Examples 1 to 4, the difference ($H_1-H_2$) between the height ($H_2$) of the seal line area and the height ($H_2$) of the active area was evaluated by a tesa μ hite measuring device and the results were described in Table 2.

Evaluation Example 2. Evaluation of Seal Line Continuity

For each of Comparative Examples 1 and 2 and Examples 1 to 4, seal line continuity was evaluated by steel ruler evaluation and the results were described in Table 2. The case where there was no breakage was evaluated as 3, the case where the number of the sealant breakage points was one or less was evaluated as 2, and the case where the number of the sealant breakage points was 2 or more was evaluated as 1.

Evaluation Example 3. Evaluation of Seal Line Width Evenness

For each of Comparative Examples 1 and 2 and Examples 1 to 4, the difference ($W_1-W_2$) between the maximum width ($W_1$) and the minimum width ($W_2$) of the seal line was evaluated by steel ruler evaluation and the results were described in Table 2. The case where the sealant width deviation was 0.5 mm or less was evaluated as 3, the case where it was 1 mm or less was evaluated as 2, and the case where it was 2 mm or less was evaluated as 1.

The results of Evaluation Examples 1 to 3 above were summarized in Table 2 below. In the overall quality level, the case where all were 3 points was evaluated as ⊚, the case where they were 2 points or 1 point without 3 points was evaluated as O, and the case where all were 1 point was evaluated as X.

S3s in FIGS. 4 and 5 are schematic diagrams showing width evenness of the seal lines of Comparative Example 1 and Example 1, respectively. As shown in FIG. 4, in Comparative Example 1, the seal line is uneven and the liquid crystal contamination occurs in the sealant due to the liquid crystal overflow, whereas as shown in FIG. 5, in Example 1, the seal line can be evenly formed and the liquid crystal contamination does not occur inside the sealant.

Figure 6:
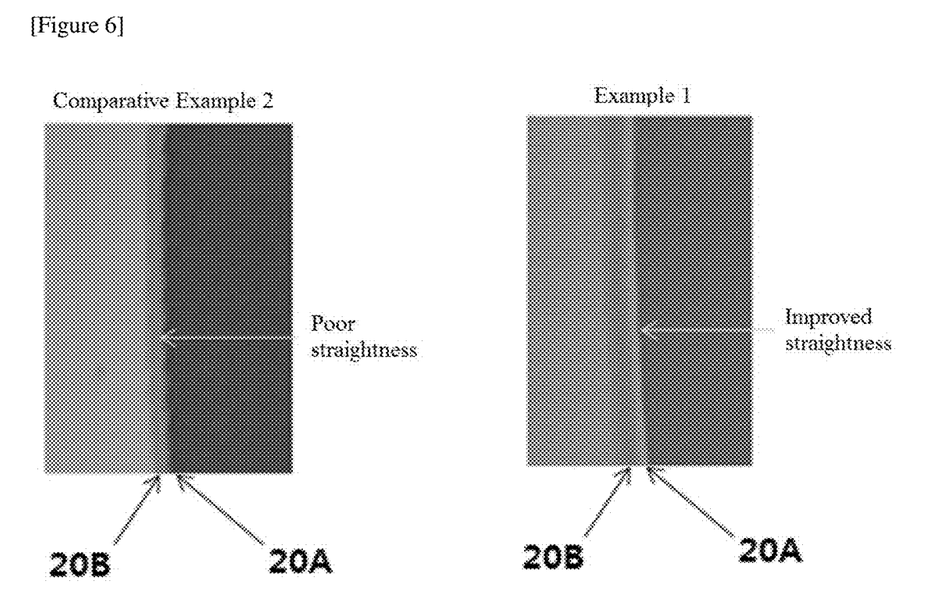
FIG. 6 is microscope images showing sealant width evenness in Example 1 and Comparative Example 2.

FIG. 6 is seal line images of smart windows of Comparative Example 2 (left) and Example 1 (right). In Comparative Example 2, the widths of the outer and inner seal lines are uneven, whereas in Example 1, the widths of the outer and inner seal lines are even, whereby it can be confirmed that the seal lines have excellent straightness.

TABLE 2

| | Height Step of Seal Line relative to Active Area | Seal Line Continuity | Seal Line Width Evenness | Overall Quality Level |
|---|---|---|---|---|
| Comparative Example 1 | 3~5 μm | 1 (breakage number: 3) | 1 | X |
| Example 1 | 0~2 μm | 3 | 3 | ⊚ |
| Example 2 | 1~4 μm | 1 (breakage number: 2) | 2 | O |
| Example 3 | 0~3 μm | 2 | 2 | O |
| Example 4 | 1~4 μm | 2 | 1 | O |
| Comparative Example 2 | 5~10 μm | 1 (breakage number: 4) | 1 | X |

Explanation of Reference Numerals and Symbols

100: smart window, 10: first electrode film, 40: second electrode film, 30: light modulating layer, 20: seal line, 20A: inner seal line, 20B: outer seal line, 200: dispenser, 50: needle of nozzle, 60: screw master, 70: air hose, 80: syringe, I: inner diameter of needle, S: drawing advancing direction, D: distance between needle and first electrode film

The invention claimed is:

1. A method for producing a smart window, comprising:
   drawing a first sealant on a first electrode film using a first nozzle to form an inner seal line; and
   drawing a second sealant on an outside of the inner seal line using a second nozzle to form an outer seal line, wherein a viscosity of the first sealant is higher than a viscosity of the second sealant, a discharge amount of the first nozzle is smaller than a discharge amount of the second nozzle, and an inner diameter of the first nozzle is smaller than an inner diameter of the second nozzle.

2. The method for producing the smart window according to claim 1, wherein the viscosity of the first sealant is in a range of 200,000 mPas to 300,000 mPas.

3. The method for producing the smart window according to claim 1, wherein the viscosity of the second sealant is 60,000 mPas or less.

4. The method for producing the smart window according to claim 1, wherein the discharge amount of the first nozzle is in a range of 100 rpm to 180 rpm.

5. The method for producing the smart window according to claim 1, wherein the discharge amount of the second nozzle is in a range of 200 rpm to 400 rpm.

6. The method for producing the smart window according to claim 1, wherein the inner diameter of the first nozzle is in a range of 0.05 mm to 0.15 mm.

7. The method for producing the smart window according to claim 1, wherein the inner diameter of the second nozzle is in a range of 0.21 mm to 0.52 mm.

8. The method for producing the smart window according to claim 1, wherein drawing speeds of the first sealant and the second sealant are each in a range of 1000 mm/min to 3000 mm/min.

9. The method for producing the smart window according to claim 1, wherein the drawing the first sealant comprises:
   controlling a distance between a needle of the first nozzle and the first electrode film is in a range of 120 μm to 180 μm.

10. The method for producing the smart window according to claim 1, wherein the drawing the second sealant comprises:
    controlling a distance between a needle of the second nozzle and the first electrode film is in a range of 150 μm to 250 μm.

11. The method for producing the smart window according to claim 1, further comprising
    forming a light modulating layer in an inner region divided by the inner seal line after forming the outer seal line.

12. The method for producing the smart window according to claim 11, wherein the light modulating layer comprises liquid crystals or a mixture of liquid crystals and a dye.

13. The method for producing the smart window according to claim 1, further comprising:
    bonding a second electrode film to the first electrode film together after forming the outer seal line.

14. The method for producing the smart window according to claim 13, wherein the first electrode film and the second electrode film each comprise a plastic film and a conductive layer formed on the plastic film.

15. A smart window comprising:
    a first electrode film and a second electrode film disposed opposite to the first electrode film; and
    a light modulating layer between the first electrode film and the second electrode film and a seal line bonding the first electrode film and the second electrode film together, wherein the seal line comprises an inner seal line and an outer seal line, a viscosity of the inner seal line is higher than a viscosity of the outer seal line and a difference ($H_1-H_2$) between a first height ($H_1$) of a seal line area defined by the seal line and a second height ($H_2$) of an active area where the light modulating layer is present is less than 5 μm.

16. The method for producing the smart window according to claim 3, wherein the viscosity of the second sealant is in a range of 15,000 mPas to 60,000 mPas.

* * * * *